BOOTSTRAPPED CHARGE-SENSITIVE LOW NOISE AMPLIFIER

Filed Sept. 29, 1970

CHARLES W. WILLIAMS
DALE A. GEDCKE
INVENTORS

BY Ralph L. Cadwallader
Laurence F. Berg Kamin
ATTORNEYS 3,713,031

BOOTSTRAPPED CHARGE-SENSITIVE LOW NOISE AMPLIFIER

Charles W. Williams, Knoxville, and Dale A. Gedcke, Oak Ridge, Tenn., assignors to Ortec, Incorporated, Oak Ridge, Tenn.

Filed Sept. 29, 1970, Ser. No. 76,349
Int. Cl. H03f *3/04*; H03k *3/00*
U.S. Cl. 330—16 5 Claims

ABSTRACT OF THE DISCLOSURE

When used with a capacitive transducer input, the overall noise figure of an amplifier system is significantly reduced by making use of the combined functions of bootstrapping and charge sensitivity of the input active device.

BACKGROUND OF THE INVENTION

This invention relates to amplifiers in general and, more particularly, to amplifier systems utilizing both bootstrapping and charge sensitivity to significantly minimize or reduce the overall noise figure of the amplifier.

Energy resolutions obtained, when measuring certain medium and high energy levels (such as gamma or beta radiations) have long since reached the limits, particularly in the case of germanium and silicon detectors. This is due primarily to the fact that the limits are imposed by the statistical nature of the germanium and silicon carrier creation. Therefore, any improvement in the overall noise figure of the amplifier system would serve no useful purpose for energy above a certain level.

However, if the detected energy falls below a certain energy level, the preamplifier noise would be principally responsible for limitations in the resolution of the overall system. Thus, at low energy levels the preamplifier noise is of significant importance.

Our invention involves an amplifier (pre-amplifier) which makes use of the combined functions of bootstrapping (positive feedback) and charge sensitivity to achieve a reduction in overall amplifier noise figure as well as a reduction of the amplifier's sensitivity to changes in detector capacity when the amplifier is used with a radiation detector, or capacitive transducer at its input. The purpose of the bootstrapping is to make the effective detector and stray capacity much less than would be the case in a conventional charge sensitive pre-amplifier. By achieving the lower effective capacity, the noise generated by the amplifier is reduced. Moreover, this invention involves also a unique system wherein the detector mount, amplifier and feedback network are enclosed in a container which may be also bootstrapped. This container appears, to all internal components, as an effective ground and therefore allows the stray capacities to be degenerated by the bootstrap effect, where, in a conventional charge sensitive amplifier, they would not have been degenerated. Our invention also contemplates the use of the "Miller effect," which may be defined as the effect, due to feedback, which causes the input capacitance of an electronic amplifier to be greater than the sum of the static interelectrode capacitances.

It is, therefore, one object of the present invention to provide an improved amplifier system utilizing the "Miller effect."

Another object of the present invention is to provide an improved amplifier system utilizing the combined effects of charge sensitivity and bootstrapping.

Still another object of the present invention is to provide an improved amplifier system wherein the signal source is enclosed within a bootstrapped shield.

The features of our invention which we believe to be novel are set forth in the appended claims. The invention, itself, however, both as to its organization and method of operation, together with further objects and advantages thereof, may best be understood by reference to the following description of the preferred embodiment, taken in conjunction with the accompanying drawings.

DETAILED DESCRIPTION OF THE PREFERRED EMBODIMENT

Figure 1:
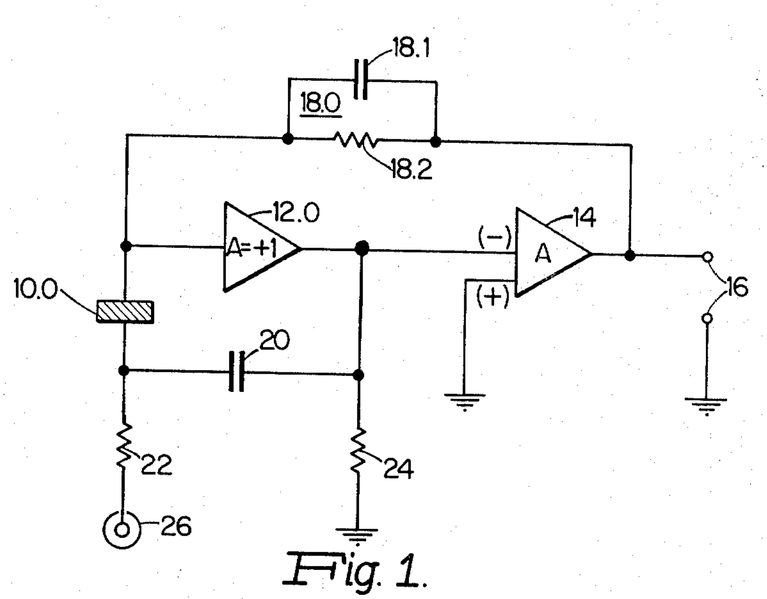
FIG. 1 is a block diagram of our novel circuit.

Referring now to FIG. 1 there is shown a capacitive detector 10.0 having one plate connected to unity gain amplifier 12.0 as an input thereto. (The indication of $A=+1$ signifying unity gain.) The output of amplifier 12.0 is applied as an input to amplifier 14, having a relatively high gain, the output of which is connected to the ungrounded terminal of output terminals 16. Amplifiers 14 and 12.0 are further provided with a feedback network 18.0 wherein AC feedback is provided by means of capacitor 18.1 and DC feedback is provided by means of resistor 18.2. The feedback provided by network 18.0 is from the output of amplifier 14 back to input of amplifier 12.0.

To provide the bootstrapping, capacitor 20 is provided between the output of amplifier 12.0 and the other plate of capacitive detector 10.0. The output from amplifier 12.0 is developed across resistor 24 connected between amplifier 12.0 and a source of reference potential, herein shown as ground. The AC signal developed across resistor 24 is also applied to the remaining plate of capacitive detector 10.0 together with the operating bias. Operating bias is provided at terminal 26 and is applied to detector 10.0 by means of resistor 22.

Figure 2:
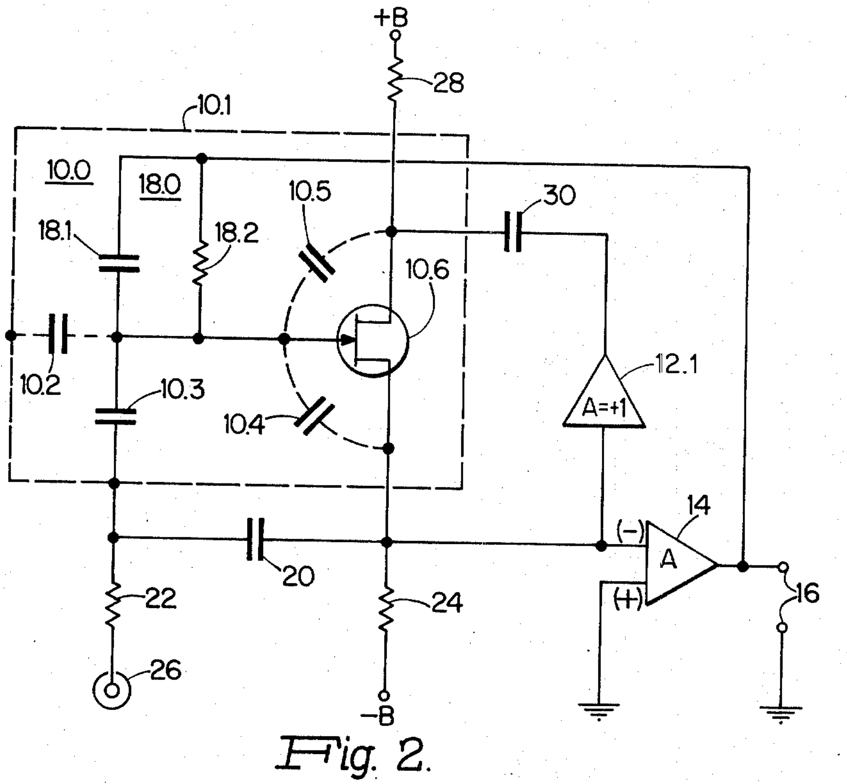
FIG. 2 is a more detailed showing of the novel circuit of FIG. 1.

Referring now to FIG. 2 there is shown a more detailed configuration of our novel circuit and includes a preamplifier 10.6 which had, in FIG. 1, been broadly included in unity gain amplifier 12.0 (the block labelled $A=+1$). In this embodiment, while a FET (Field Effect Transistor) is shown as the active device 10.6, it will be obvious to those skilled in the art that other devices may be substituted therefor. FET 10.6 has the usual drain, gate and source elements or electrodes, together with the inherent gate-to-drain interelectrode capacity 10.5 (herein designated with dashed lines) and the usual gate-to-source capacitance 10.4 (also designated by dashed lines). Feedback network 18.0 is connected between the gate of active device 10.6 and the output of amplifier 14 and is provided with the usual AC feedback capacitor 18.1 and the DC feedback resistor 18.2. Ungrounded terminal 16 is also connected to the output of amplifier 14. The detector, herein designated as capacitor 10.3 has one plate thereof connected to the gate of active device 10.6 and its other or biased side thereof connected to the shield 10.1 which in turn is connected, through resistor 22, to a source of detector bias available at terminal 26.

The operating potential for FET 10.6 is provided by means of the terminals indicated as +B and —B. +B is connected, through resistor 28, to the drain of FET 10.6, while the source electrode is connected to —B by means of resistor 24. One end of bootstrap capacitor 20 is connected to the junction of resistor 24 and the source of FET 10.6 while the other end of capacitor 20 is connected to the junction of the biased plate of detector 10.3, the shield 10.1 and resistor 22, to apply any AC signal developed across resistor 24, to the biased plate of detector 10.3. The signal developed across resistor 24 is applied as an input to unity gain amplifier 12.1, the output of which is coupled by means of capacitor 30, back to the drain of active device 10.6. The signal developed across resistor 24 is also applied as an input to amplifier 14. Capacitor 10.2 is shown connected between the gate of FET 10.6 and enclosure 10.1 and represents the stray capacity.

Referring now to both FIGS. 1 and 2, it will be seen that incident radiation falling on or detected by capacitive detector 10.3 liberates a quantity of charge therefrom which may be referred to as charge Q. Since amplifier 14 has a very high open-loop gain, and is of the inverting type, charge Q is collected on capacitor 18.1 creating an output, where:

$$V_o=\frac{Q}{C_f} \quad (1)$$

and $C_f$ represents the capacitance 18.1. The output of FET 10.6 (shown in FIG. 2 as the output developed across resistor 24) is returned to the biased plate of capacitor 10.3 via bootstrap capacitor 20 which has a relatively high capacitance, the value of which must be large compared to that of capacitive detector 10.3 and stray capacity 10.2 to achieve maximum effectiveness. The necessary DC feedback for pre-amplifier 10.6 is achieved through resistor 18.2 of feedback network 18.0.

The stray capacitance 10.2 ($C_s$)-to-shield 10.1 is bootstraped as is the gate-to-source capacity 10.4 ($C_{gs}$) and the detector capacitance 10.3 ($C_d$) because of the connections shown, is reduced in effective value by the following expressions:

$$C_s(\text{effective})=C_s(1-A_{gs}) \quad (2)$$

$$C_d(\text{effective})=C_d(1-A_{gs}) \quad (3)$$

where: $A_{gs}$ is the gate-to-source gain; and $$C_{gs}(\text{effective})=C_{gs}(1-A_{gs}) \quad (4)$$

Further, any impedance (Z) to ground will be increased in its effective value to:

$$Z\,(\text{effective})=\frac{Z}{(1-A_{gs})} \quad (5)$$

It has been found that the stray capacity caused increased noise in the amplifier and, in fact, was determined as representing a principal source of noise. Therefore, the shield 10.1 has become an important element as far as bootstrapping is concerned. Thus, the large component pre-amplifier to-shield capacity ($C_s$) is effectively reduced by the bootstrapped, feedback effect.

While the bootstrap shield is shown coupled to the high voltage side of capacitive detector 10.3, it will be obvious to those skilled in the art that this was done as a matter of convenience and should be stated herein that shield 10.1 could have been connected to the source electrode of FET 10.6 which would be closer to ground potential.

Further, while the system illustrates a DC connection between the amplifier input (gate) and the detector it will be obvious that an AC connection may also be used by the simple expedient of inserting a large capacitor between the upper plate of capacitive detector 10.3 and the amplifier input (gate). In this latter case the upper plate of capacitor 10.3 would be returned to AC ground through a large resistor and either terminal of capacitor detector 10.3 could be operated at high voltage.

A further improvement in our circuit resides in the reduction in the value of the gate-to-drain capacitance ($C_{gd}$) 10.5, by the bootstrap effect, wherein the gate-to-drain capacitance ($C_{gd}$) is reduced in effective value by the following expression:

$$C_{gd}(\text{effective})=C_{gd}(1-A) \quad (6)$$

where: A is the gain of FET 10.6 and amplifier 12.1. This is accomplished by bootstrapping the drain of FET 10.6 using capacitor 30 and amplifier 12.1.

The overall improvement resulting from the bootstrapping is a decrease in the contribution to the noise of amplifier 14 with respect to the noise of the entire amplifier system.

While we have described what is presently considered the preferred embodiment of our invention, it should now be obvious to those skilled in the art that other changes and modifications, apart from those cited, may be made herein without departing from the inventive concept, and it is therefore, aimed to cover, in the specification, all such other changes and modifications that may fall within the true spirit and scope of our invention.

What is claimed is:

1. A low noise charge sensitive amplifier circuit comprising:
   - first and second amplifiers each having an input and an output, the output of the first amplifier connected to the input of the second amplifier;
   - a capacitive transducer for detecting an input signal and providing an electrical charge in response to the input signal, said transducer including a first plate connected to the input of the first amplifier and a second plate;
   - a bootstrap capacitor connected between the output of the first amplifier and said second plate of the capacitive transducer; and
   - a feedback network comprising a capacitance and resistance connected in parallel between the output of the second amplifier and the input of the first amplifier.
2. The circuit of claim 1 wherein:
   - the first amplifier stage has unity gain; and
   - the second amplifier stage has a high gain.
3. The circuit of claim 2 wherein the first amplifier comprises:
   - a preamplifier stage having an input connected to said first plate of said transducer and an output connected to the input of said second amplifier;
   - an electric shield member enclosing the preamplifier stage and said capacitive transducer; and
   - said shield member being connected to said second plate of the capacitive transducer and the bootstrap capacitor.
4. The circuit of claim 3 wherein said preamplifier stage comprises:
   - a field effect transistor having a gate electrode coupled to said first plate of said capacitive transducer, a source electrode coupled to said bootstrap capacitor and to the input of said second amplifier, and a drain electrode; and
   - bootstrap means including a capacitance for coupling said source electrode to said drain electrode of said field effect transistor.
5. The circuit of claim 4, wherein said bootstrap means include a unity gain amplifier having an input coupled to said source electrode of said field effect transistor and an output coupled by said capacitance to said drain electrode of said field effect transistor.

References Cited

UNITED STATES PATENTS 3,299,367 1/1967 Howden ............ 330—16 X

ROY LAKE, Primary Examiner

L. J. DAHL, Assistant Examiner

U.S. Cl. X.R.

328—176; 330—35, 103